(12) United States Patent
Fujii et al.

(10) Patent No.: US 12,106,786 B2
(45) Date of Patent: Oct. 1, 2024

(54) MAGNETIC HEAD, HEAD GIMBAL ASSEMBLY, HARD DISK DRIVE, AND METHOD FOR PROCESSING MAGNETIC HEAD

(71) Applicant: SAE Magnetics (H.K.) Ltd., Hong Kong (CN)

(72) Inventors: Ryuji Fujii, Hong Kong (CN); Shi Xiong Chen, Hong Kong (CN); Zeng Hui Zhang, Hong Kong (CN); Yong Lei, Hong Kong (CN); Yong Jun Zhang, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 17/978,480

(22) Filed: Nov. 1, 2022

(65) Prior Publication Data
US 2024/0038261 A1    Feb. 1, 2024

(30) Foreign Application Priority Data
Aug. 1, 2022   (CN) .......................... 202210914728.X

(51) Int. Cl.
  *G11B 5/31*    (2006.01)
  *G11B 5/127*   (2006.01)
  *G11B 5/49*    (2006.01)

(52) U.S. Cl.
  CPC .......... *G11B 5/3169* (2013.01); *G11B 5/1276* (2013.01); *G11B 5/3173* (2013.01); *G11B 5/49* (2013.01)

(58) Field of Classification Search
  None
  See application file for complete search history.

(56) References Cited

U.S. PATENT DOCUMENTS

| | | | |
|---|---|---|---|
| 6,857,937 B2* | 2/2005 | Bajorek ................ | G11B 5/40 29/603.12 |
| 8,456,969 B1* | 6/2013 | Mooney ............... | G11B 5/6088 369/13.13 |
| 10,493,591 B1* | 12/2019 | Kunkel ................ | B24B 37/048 |
| 11,037,586 B1* | 6/2021 | Sherve ................. | B24B 37/046 |
| 11,389,924 B2* | 7/2022 | Rejda .................. | B24B 37/048 |
| 2002/0155794 A1* | 10/2002 | Fatula, Jr. ............ | G11B 5/3163 451/53 |
| 2019/0381628 A1* | 12/2019 | Habermas ............ | G11B 5/6005 |
| 2019/0381629 A1* | 12/2019 | Rejda .................. | B24B 37/048 |

* cited by examiner

*Primary Examiner* — William J Klimowicz
(74) *Attorney, Agent, or Firm* — Nixon & Vanderhye, P.C.

(57) ABSTRACT

The present disclosure discloses a magnetic head, a head gimbal assembly, a hard disk drive, and a method for processing a magnetic head. The method comprises irradiating at a fixed point proximal to the read/write part with a laser irradiation device until the read head and the write head are thermally expanded; orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar; and disassembling the magnetic strip to obtain a lapped magnetic head. Through laser heating induced compensation, the heights of lapped read head and write head of the magnetic head meet their respective target values, ensuring the normal reading and writing of the storage medium of the magnetic disk.

3 Claims, 11 Drawing Sheets

MAGNETIC HEAD, HEAD GIMBAL ASSEMBLY, HARD DISK DRIVE, AND METHOD FOR PROCESSING MAGNETIC HEAD

CROSS-REFERENCE

This application claims priority to CN 202210914728.X filed Aug. 1, 2022, the entire contents of which are hereby incorporated by reference.

TECHNICAL FIELD

The present disclosure relates to the field of hard disk processing, and in particular relates to a magnetic head, a head gimbal assembly, a hard disk drive, and a method for processing a magnetic head.

BACKGROUND

A hard disk drive is a type of storage medium that offers speed, storage volume, reliability, and affordability. It is frequently employed in the recording of digital information. The recording density of hard disk drives can surpass 100 gigabits per square inch with years of technological advancement. A hard drive contains a number of head arm assemblies, each of which comprises a drive arm and a head gimbal assembly (HGA) attached to the tip of the drive arm. The number of the head arm assemblies corresponds to the number of magnetic disks serving as storage media. The head gimbal assembly has a magnetic head, the magnetic head at least includes a writing unit (generally referred to as a write head) for writing information to a storage medium and a reading unit (generally referred to as a read head) for reading information from the storage medium. The read head and write head are arranged on the end of the magnetic head, where a bonding pad is also provided. The main function of the bonding pad is to provide a circuit welding channel connecting the magnetic recording head to the disk drive. The face of the magnetic head opposite to the storage medium is called the air bearing surface (ABS).

The read head and the write head are cemented inside the magnetic recording head through a wafering process. Although the wafering process can be used to manufacture the magnetic head, there are technical restrictions on how the read head and the write head in the magnetic head can be further processed. Because of this, it is difficult to effectively control how high the read and write heads are, which has an undesirable influence on how the storage media on the disk is normally read and written. A critical technical challenge that needs to be solved is how to guarantee that the read head and write head heights of the magnetic head reach their respective goal values, ensuring normal reading and writing of the storage medium.

SUMMARY OF THE DISCLOSURE

To overcome the drawbacks of the prior art that the heights of the read head and the write head of a magnetic head cannot meet their respective target values, an objective of the present disclosure is to provide a magnetic head, a head gimbal assembly, a hard disk drive, and a method for processing a magnetic head. Through laser heating induced compensation, the heights of the lapped read head and write head of the magnetic head meet their respective target values, ensuring the normal reading and writing of the storage medium of the magnetic disk.

To achieve the objective above, the embodiments of the present disclosure provide a method for processing a magnetic head, the magnetic head comprising a substrate and a thin-film magnetic head formed at an end of the substrate, the thin-film magnetic head comprising a read/write part and a bonding pad part proximate to the read/write part, the read/write part is in the form of a protruding part and is arranged on an air bearing surface opposite to a storage medium, and the read/write part has a write head for writing information in the storage medium and a read head for reading information from the storage medium; the bonding pad part comprises a welding contact point formed on an end surface of the thin-film magnetic head, wherein the method for processing the magnetic head comprises:

irradiating at a fixed point proximate to the read/write part with a laser irradiation device until the read head and the write head are thermally expanded;

orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar;

disassembling the magnetic strip to obtain a lapped magnetic head.

As a preferred embodiment, the step of irradiating at the fixed point proximate to the read/write part with the laser irradiation device until the read head and the write head are thermally expanded comprises:

irradiating the bonding pad part at a fixed point with the laser irradiation device until a heated welding contact point transfers heat to the read head and the write head, resulting in thermal expansion of the read head and the write head.

As a preferred embodiment, the step of irradiating the bonding pad part at the fixed point with the laser irradiation device comprises:

irradiating a welding contact point located at a preset distance from the write head with the laser irradiating device.

As a preferred embodiment, the preset distance is 10 μm to 20 μm.

As a preferred embodiment, wherein the step of irradiating at the fixed point proximate to the read/write part with the laser irradiation device until the read head and the write head are thermally expanded comprises:

irradiating the air bearing surface proximate to the read/write part with the laser irradiation device until an open end of the read head, which protrudes from the air bearing surface and is exposed, transfers heat to the read head and the write head, resulting in thermal expansion of the read head and the write head.

As a preferred embodiment, the step of irradiating at the fixed point proximate to the read/write part with the laser irradiation device until the read head and the write head are thermally expanded comprises:

irradiating the air bearing surface proximate to the read/write part with the laser irradiation device until an open end of the write head, which protrudes from the air bearing surface and is exposed, transfers heat to the read head and the write head, resulting in thermal expansion of the read head and the write head.

Another embodiment of this disclosure provides a magnetic head produced by the method described above.

Yet another embodiment of this disclosure provides a head gimbal assembly comprising the magnetic head described above configured opposite to the storage medium; and a cantilever member elastically supporting the magnetic head.

Yet another embodiment of this disclosure provides a hard disk drive comprising the magnetic head described above configured opposite to the storage medium; and a positioning device determining a position of the magnetic head with respect to the storage medium while supporting the magnetic head.

Compared to the prior art, the beneficial effects of the embodiment of the present disclosure is one of the following:

(1) During processing, a laser irradiation device is used to irradiate a specific position of the read/write part of the magnetic head. Heating induces expansion of the read head and the write head following the principles of heat transfer and thermal expansion/contraction. The subsequent lapping process laps the magnetic heads to adjust the height of the magnetic heads such that at the end of the process, the heights of the read head and the write head of each magnetic head meet their respective target values. This enables the best performance for reading from and writing to the disk's storage medium.

(2) Directly lapping the read head and the write head is not possible due to the very small distance of only around 5 μm between the two. Current lapping techniques are unable to achieve height control at nanometer level in such a small range. In the present technical solution, the magnetic heads are lapped in batches, that is, a lapping device is used to process heat expanded magnetic heads, the final heights of the read head hr and the write head hw can be precisely controlled by integrated lapping.

Figure 1:
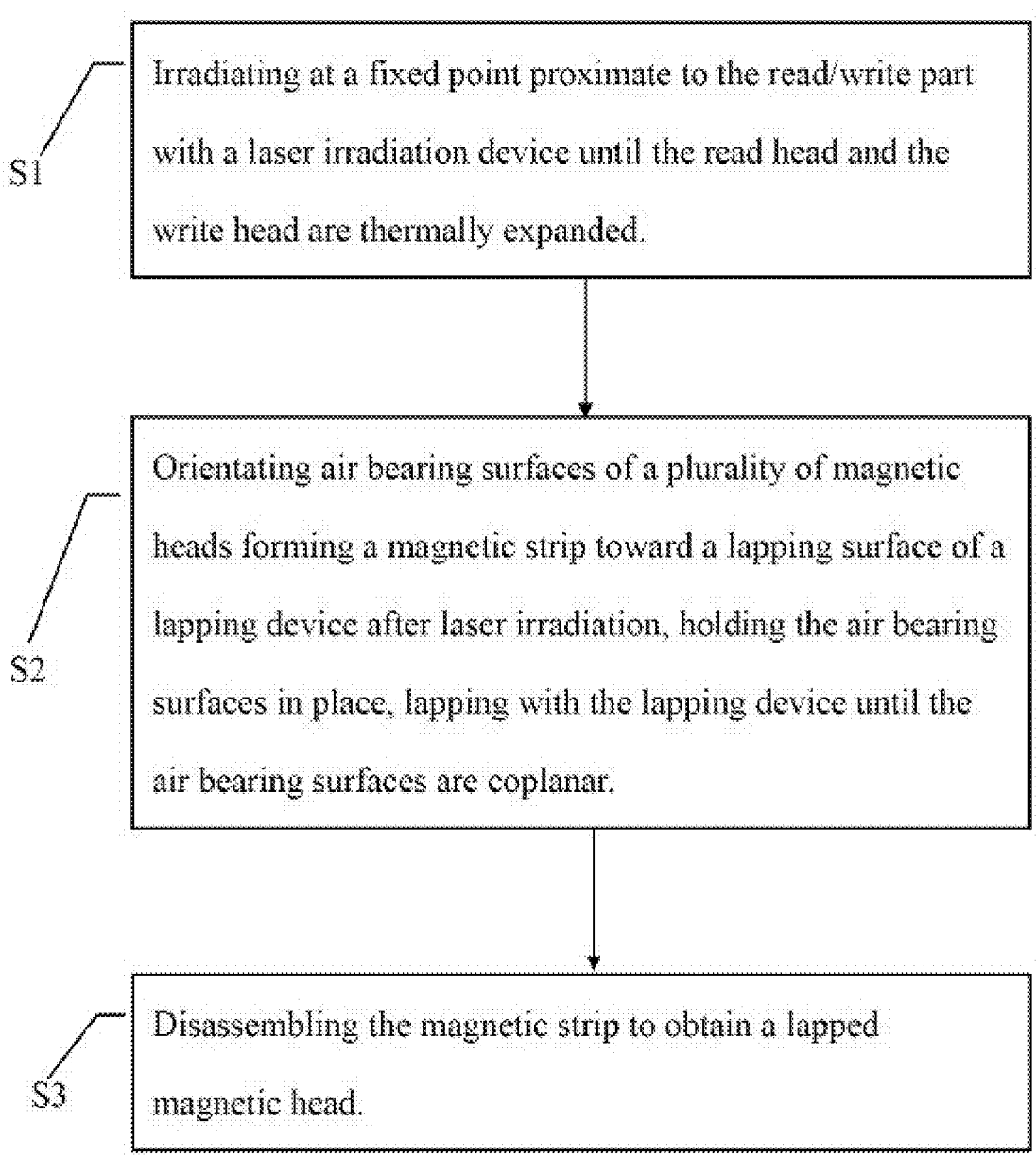
FIG. 1 is a flowchart illustrating a method for processing a magnetic head according to an embodiment of the present disclosure.

Reference signs: 1—substrate; 2—thin-film magnetic head; 3. read/write part; 4—welding contact point; 5—flexible member; 6—load rod; M—measuring unit; P—storage medium.

In the drawings, the directions of all coordinate systems are consistent: x represents the front-rear direction, y represents the left-right direction, and z represents the up-down direction.

DETAILED DESCRIPTION OF EMBODIMENTS

The technical solutions of the present disclosure will be clearly and fully described below with reference to the accompanying drawings and the embodiments of the present disclosure. The embodiments described herein are only a part and not all of the possible embodiments of the present disclosure. The aim of providing these embodiments is to ensure the present disclosure is complete and comprehensive. Based on the embodiments of the present disclosure, all other embodiments obtained by those of ordinary skill in the art without creative input shall fall within the protection scope of the present disclosure.

In the description of this application, the terms "first", "second", "third", etc. are only used for descriptive purposes and should not be understood as indicating or implying relative importance or implicitly indicating the number of indicated technical features. Thus, a feature described by "first", "second", "third" may expressly or implicitly include one or more of such features. In the description of this application, unless stated otherwise, "plurality" means two or more.

In the description of this application, it should be noted that unless otherwise expressly specified and limited, the terms "installed", "connected" and "coupled" should be understood in a broad sense. For example, they may denote fixed connection, detachable connection, integrated connection, mechanical connection, or electrical connection; the subjects can be directly connected, indirectly connected through an intermediate medium or connected internally. The terms "vertical", "horizontal", "left", "right", "upper", "lower" and similar expressions used herein are for illustration only and do not indicate or imply that the device or element must have a particular orientation or be constructed and operated in a particular orientation. Therefore, these terms are not to be construed as limitations of the disclosure. As used herein, the term "and/or" includes any and all combinations of one or more of the listed items. For those of ordinary skill in the art, the specific meanings of the above terms in the present application can be understood according to the specific situations.

In the description of the present disclosure, it should be noted that unless otherwise defined, all technical and scientific terms used in the present disclosure have the same meaning as commonly understood by those skilled in the art. The terms used in the specification of the present disclosure are only to describe specific embodiments, and are not intended to limit the scope of the present disclosure. For those of ordinary skill in the art, the specific meanings of the above terms in the present application can be understood based on the specific conditions.

An embodiment of the present disclosure provides a method for processing a magnetic head. Please refer to FIG. 1, which is a flowchart of a method for processing a magnetic head according to one embodiment of the present disclosure. The method comprises steps S1-S3, specifically:

S1—irradiating at a fixed point proximate to the read/write part with a laser irradiation device until the read head and the write head are thermally expanded;

S2—orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar;

S3—disassembling the magnetic strip to obtain a lapped magnetic head.

Figure 2:
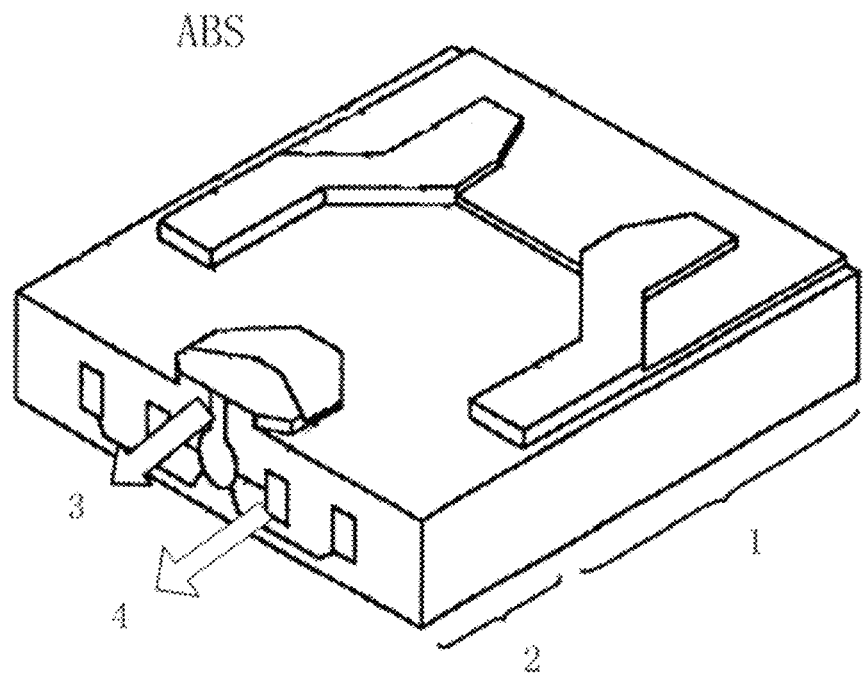
FIG. 2 is a structural diagram illustrating a magnetic head according to an embodiment of the present disclosure.

It should be noted that for the magnetic head processing method provided by the present disclosure, a structural diagram of the magnetic head is shown in FIG. 2. The magnetic head specifically includes substrate 1 and thin-film magnetic head 2 formed at the end of substrate 1. As shown in FIG. 2, substrate 1 is on the right-hand side of the figure and has a square structure. Thin-film magnetic head 2 is formed at the left end surface of substrate 1, and thin-film magnetic head 2 also has a square structure. In the present disclosure, substrate 1 and thin-film magnetic head 2 are formed through a known technique (such as etching), which will not be described in detail here. Thin-film magnetic head 2 comprises a read/write part 3 and a bonding pad part, read/write part 3 is in the form of a protruding part, and is arranged on the air bearing surface (ABS, which is the top surface in the figure) opposite to a storage medium. Read/write part 3 has a write head (hw) for writing information in the storage medium and a read head (hr) for reading information from the storage medium (the sizes of the read head and the write head are both in the nanometer level and thus they are not shown in FIG. 2. The protruding part shown in FIG. 2 can represent the read head and the write head). Apart from read/write part 3, the bonding pad part is also provided at the end surface of the square-shaped thin film magnetic head 2. The "bonding pad" is an integral part of a magnetic recording head, and its main function is to provide a circuit welding channel that connects the magnetic recording head to a disk drive. The bonding pad part in FIG. 2 comprises a set of square welding contact points 4.

In step S1 of the magnetic head processing method provided by the embodiment of the present disclosure, a laser irradiation device is used to irradiate at a fixed point proximal to the read/write part 3. Based on the principles of heat transfer and thermal expansion and contraction, heating induces expansion of the read head and the write head. The subsequent lapping process laps the magnetic heads to adjust the heights of the magnetic heads such that at the end of the process, the heights of the read head and the write head of each magnetic head meet their respective target values. This enables the best performance for reading from and writing to the disk's storage medium.

The position of laser irradiation and heating is particularly important and is key to heating induced compensation. The read head hr and the write head hw are cemented inside the magnetic recording head in the previous wafering process, hence they can only be heated and controlled in an indirect way. In this disclosure, two embodiments are presented to describe the heating position.

Embodiment 1

Figure 3:
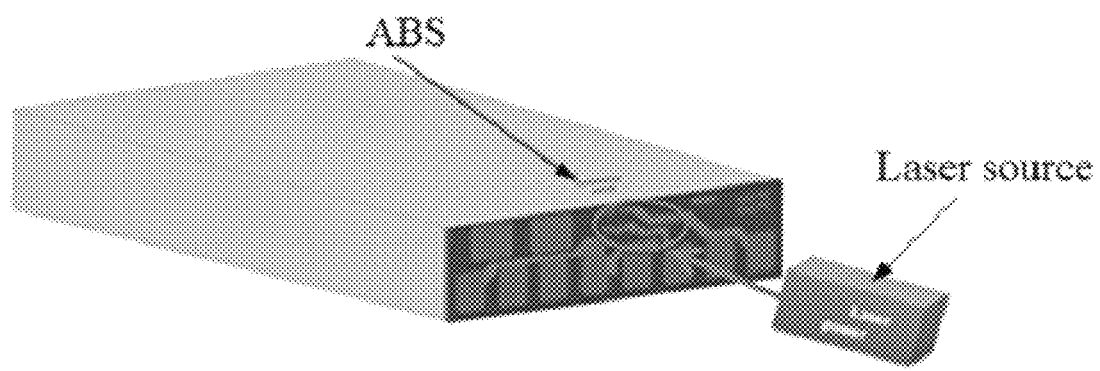
FIG. 3 shows the heating position of embodiment 1 of the present disclosure.

FIG. 3 is a schematic diagram showing the heating position of embodiment 1. In this embodiment, a laser irradiation device is used to irradiate the bonding pad part at a fixed point. According to the design of the magnetic recording head, the distance between the bonding pad surface and the write head hw is only about 15 μm, and the distance between the read head hr and the write head hw is only about 5 μm. Thus, heat can be efficiently transferred to the read head hr and the write head hw by irradiating the bonding pad part at a fixed point. In this embodiment, the preferred irradiation position is a welding contact point located 15 μm from the write head. Although there are multiple welding contact points close to the write head, it is difficult for welding contact points that are too far away to achieve good heat transfer results. Therefore, in this embodiment, it is preferable to irradiate the welding contact points that are close to the write head, for example, a welding contact point 10 μm from the write head, or a welding contact point 12 μm from the write head. After extensive experiments and analysis carried out by the inventor, it is found that welding contact points in the range of 10 μm to 20 μm from the write head allow good heat transfer. The selection of welding contact points is determined by actual product processing design requirements. As long as the welding contact point can transfer heat to the read head and the write head and cause both to expand, it is regarded as a key protection feature of the present disclosure and will not be further discussed here.

Embodiment 2

Figure 4:
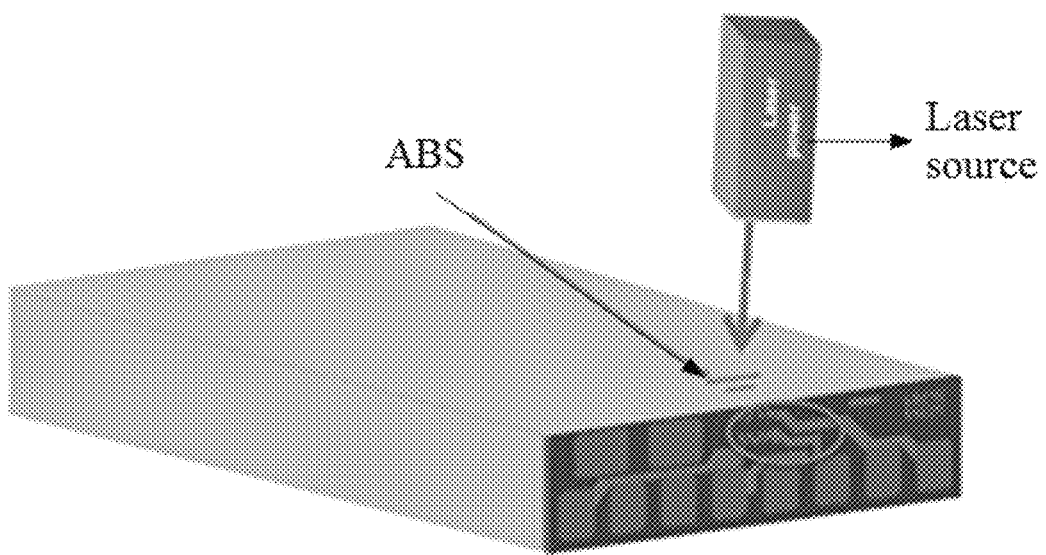
FIG. 4 shows the heating position of embodiment 2 of the present disclosure.

FIG. 4 is a schematic diagram showing the heating position of embodiment 2. In this embodiment, a laser irradiation device is used to irradiate the air bearing surface (ABS) proximate to the read/write part. Both the open ends of the read head hr and the write head hw are visible on the ABS surface when viewed from above. The air bearing surface (ABS) proximate to the open ends is irradiated until the open end of the read head, which protrudes from the air bearing surface and is exposed, transfers heat to the read head and the write head, or the open end of the write head, which protrudes from the air bearing surface and is exposed, transfers heat to the read head and the write head. As a result, the read head and the write head are thermally expanded, and the heights of the read head hr and the write head hw can be precisely controlled in the end.

Embodiment 1 and Embodiment 2 above focus on the irradiation position of the laser irradiation device. Those skilled in the art understand that the incidence angles of the laser sources affect the heating effect at the same irradiation position differently. Vertical irradiation at 90°, oblique irradiation at 120°, and other angles can be used in the current disclosure as long as good heating and heat transfer effects are achieved.

Figure 10:
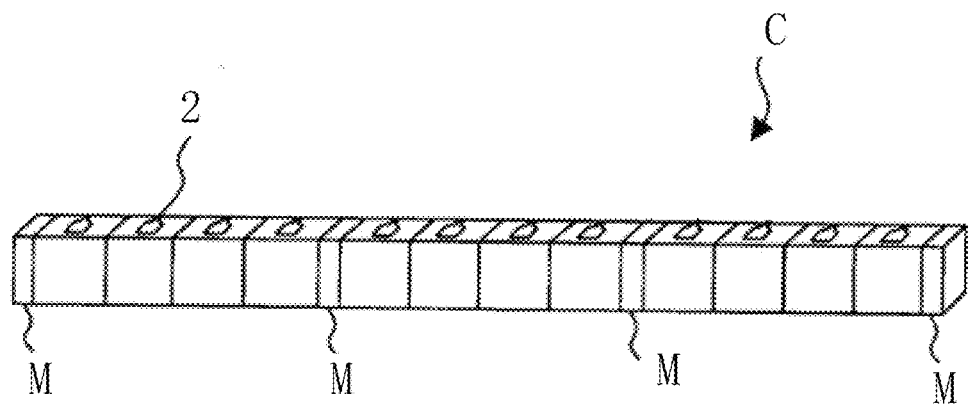
FIG. 10 is a structural diagram of a magnetic strip in an embodiment of the present disclosure.

In the embodiments above, step S2 involves orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar. "Lapping" refers to lapping ABS. In the mass production of magnetic heads, lapping is performed not on a single magnetic head, but on a magnetic bar comprising a plurality of magnetic heads. The ABS produced by the lapping process must be ideally coplanar in order to meet design specifications. Directly lapping the read head and the write head is not possible due to the very small distance of only 5 μm between the two as mentioned above. Current lapping techniques are unable to achieve height control at a nanometer level in such a small range. Therefore, in the present technical solution, heating is first performed to produce the desired expansion, the final heights of the read head hr and the write head hw can then be precisely controlled by integrated lapping. Specifically, please refer to FIG. 10. FIG. 10 is a structural diagram of a magnetic strip in one embodiment of the present disclosure. A plurality of magnetic heads A is combined along the length direction to form a magnetic strip C. The thin-film magnetic head 2 of each magnetic head A is oriented upward (and forming the lapping surface). Preferably, a measurement unit M can be added to manage the lapping amount of each thin-film magnetic head 2. Of course, it is possible that magnetic strip C is not provided with measuring unit M; this is determined by actual product processing requirements and will not be discussed in more detail herein.

Figure 5A:
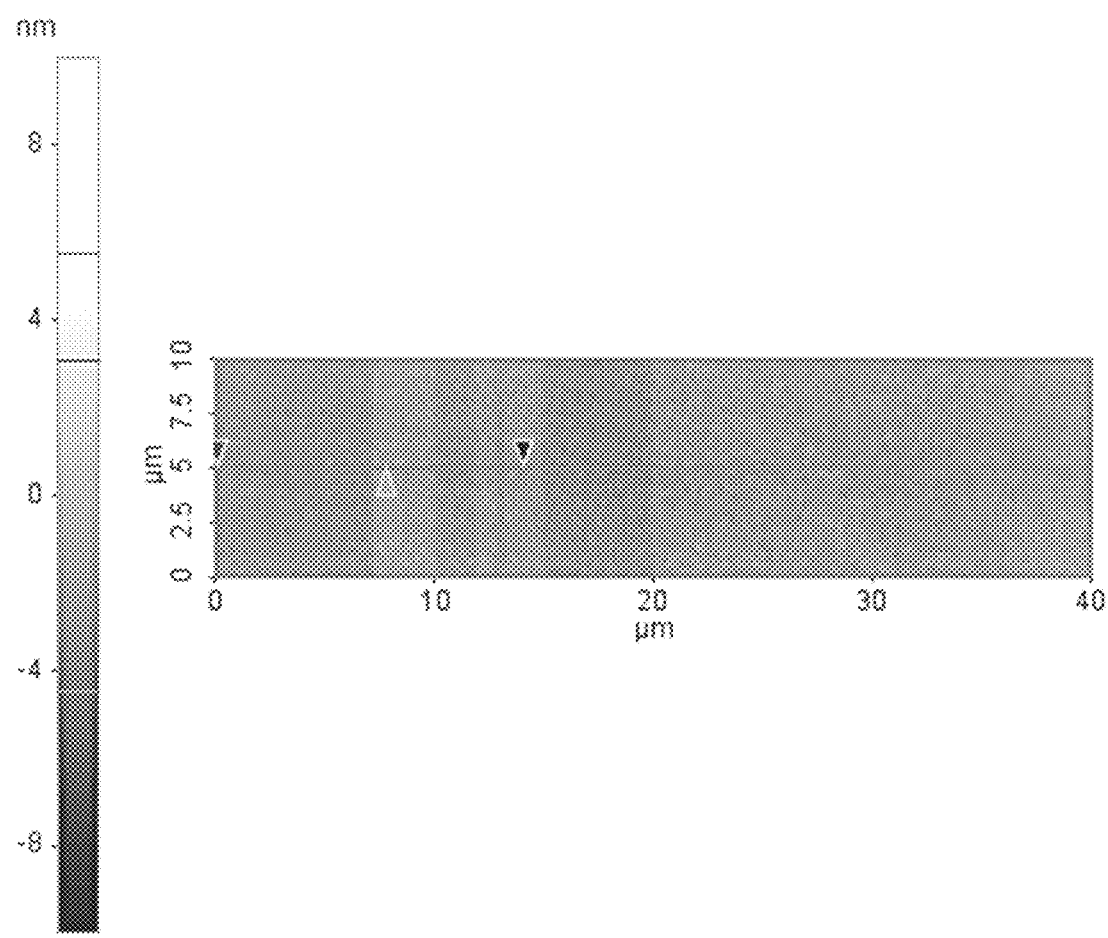
FIGS. 5A-5B are diagrams presenting the height data of the read head and the write head of an initial magnetic head recorded in an embodiment of the present disclosure.
Figure 5B:
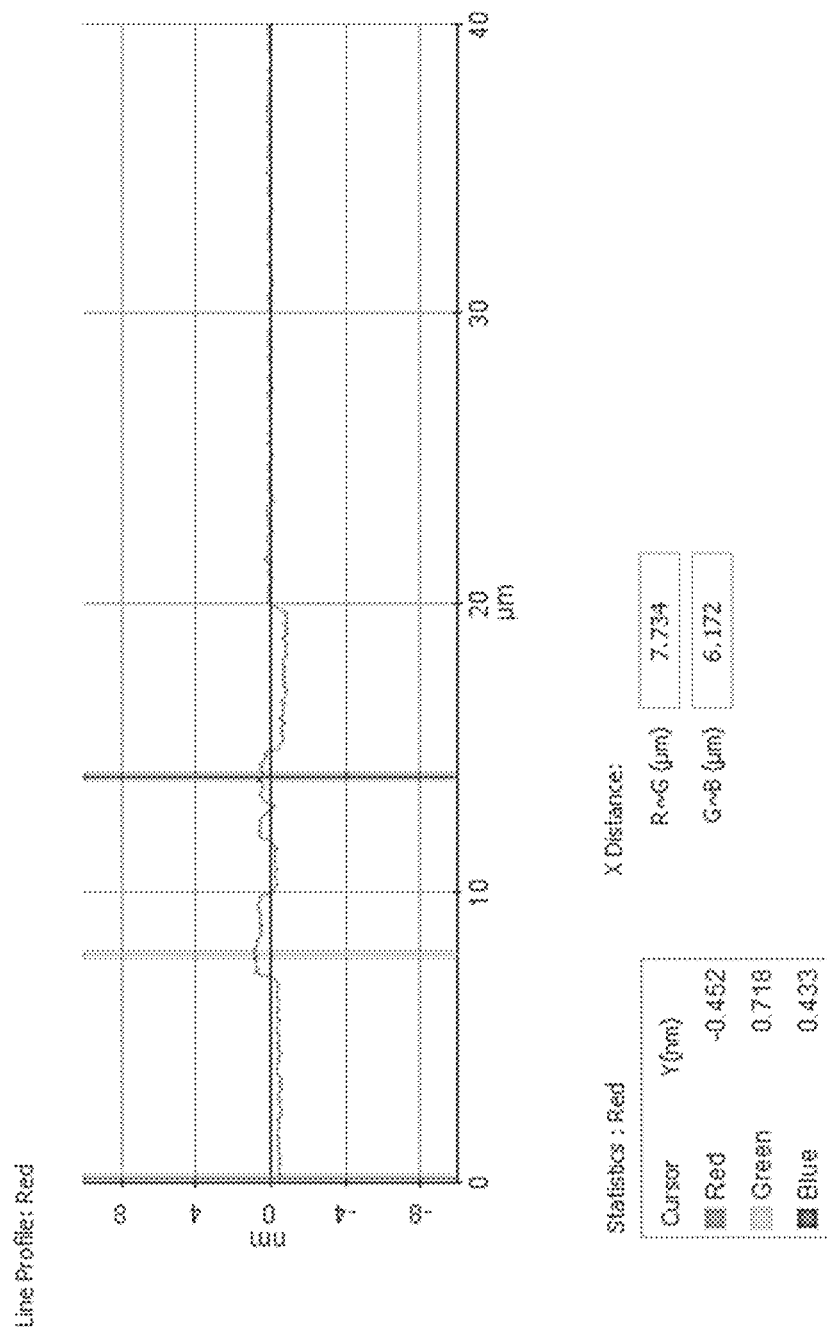
Figure 6A:
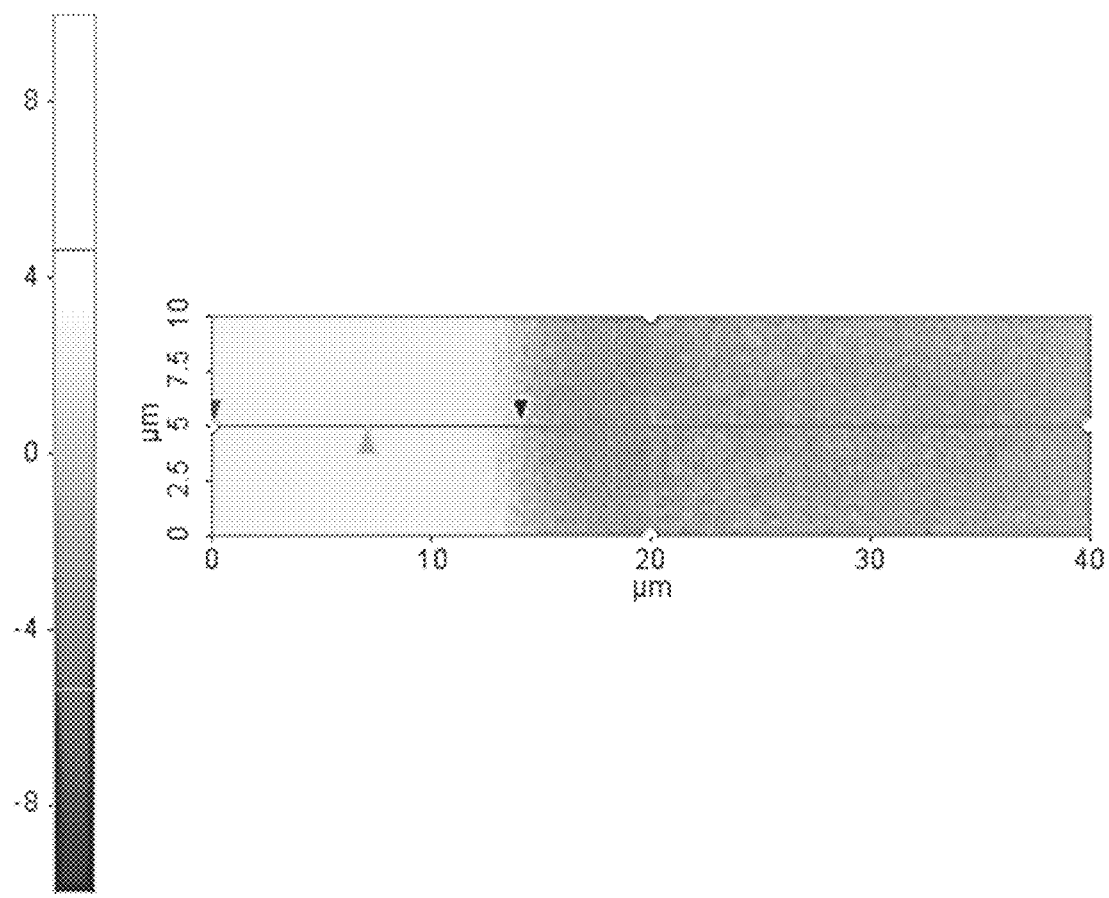
FIGS. 6A-6B are diagrams presenting the height data of the read head and the write head of a laser irradiated magnetic head recorded in an embodiment of the present disclosure.
Figure 6B:
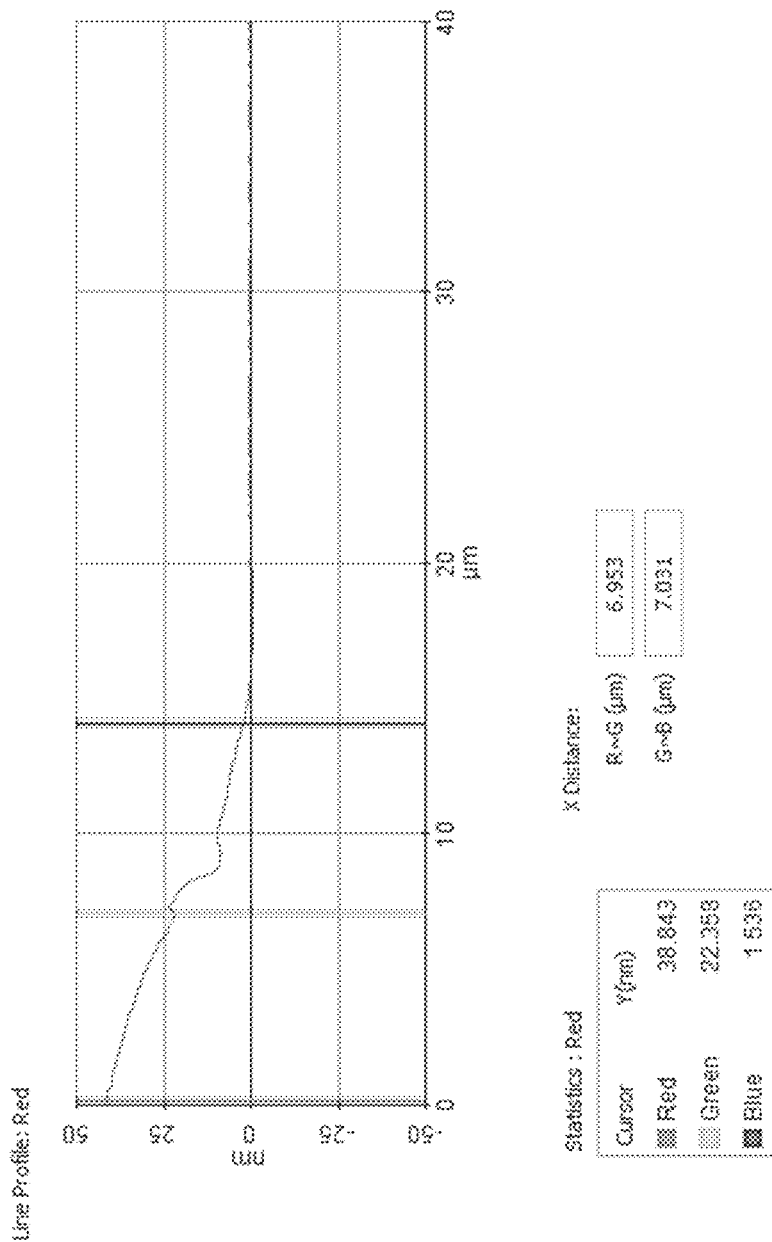
Figure 7A:
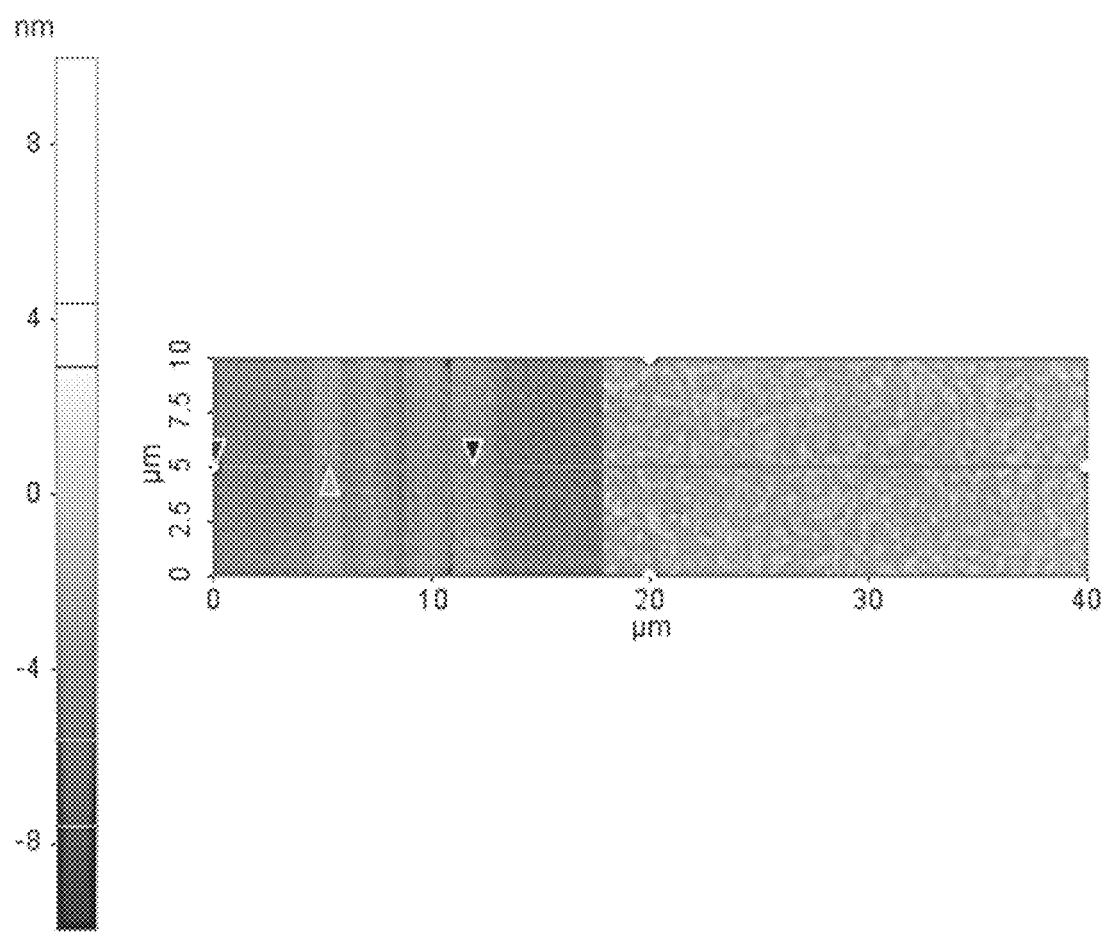
FIG. 7A-7B are diagrams presenting the height data of the read head and the write head of a lapped magnetic head detected in an embodiment of the present disclosure.
Figure 7B:
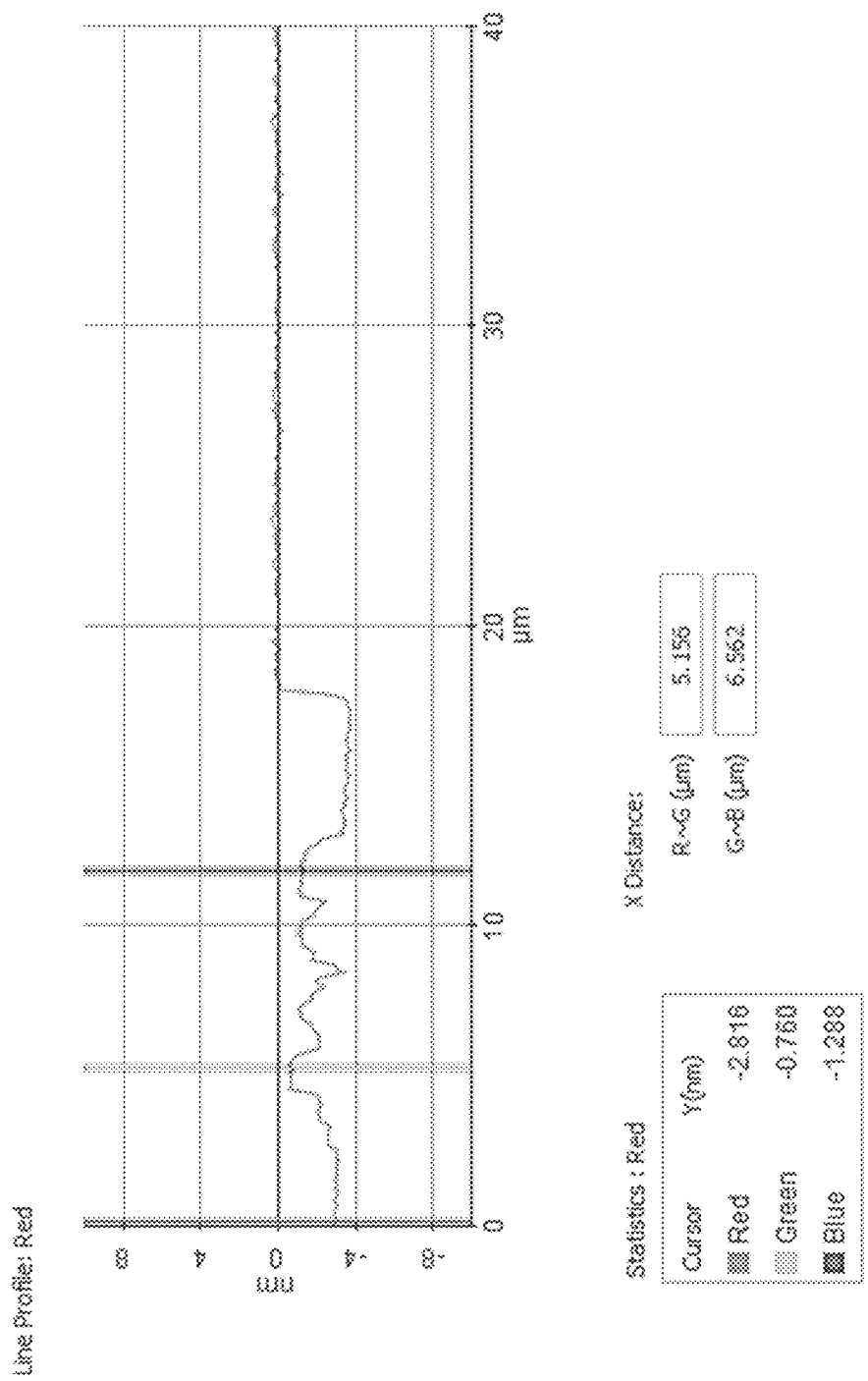

FIGS. 5A-5B, 6A-6B, and 7A-7B demonstrate the technical effects of a magnetic head product provided by the present disclosure based on heating induced compensation (HIC). An atomic force microscope (AFM) is adopted by the present disclosure for data monitoring. FIGS. 5A-5B show height data of the write head and the read head of an initial magnetic head, wherein FIG. 5A illustrates the test area on the ABS surface, FIG. 5B shows the surface height profile in the X direction generated according to the measurement results of the test area. FIGS. 6A-B show height data of the read head and the write head of the magnetic head after laser irradiation, wherein FIG. 6A illustrates the test area on the ABS surface, FIG. 6B shows the surface height profile in the X direction generated according to the measurement results of the test area. FIGS. 7A-B show height data of the read head and the write head detected after lapping the magnetic head, wherein FIG. 7A illustrates the test area on the ABS surface, FIG. 7B shows the surface height profile in the X direction generated according to the measurement results of the test area. The heights of the read head hr and the write head hw at a particular position can be found in the figures. These profiles are important for verifying the heights of the laser-heated read head hr and write head hw.

Figure 8:
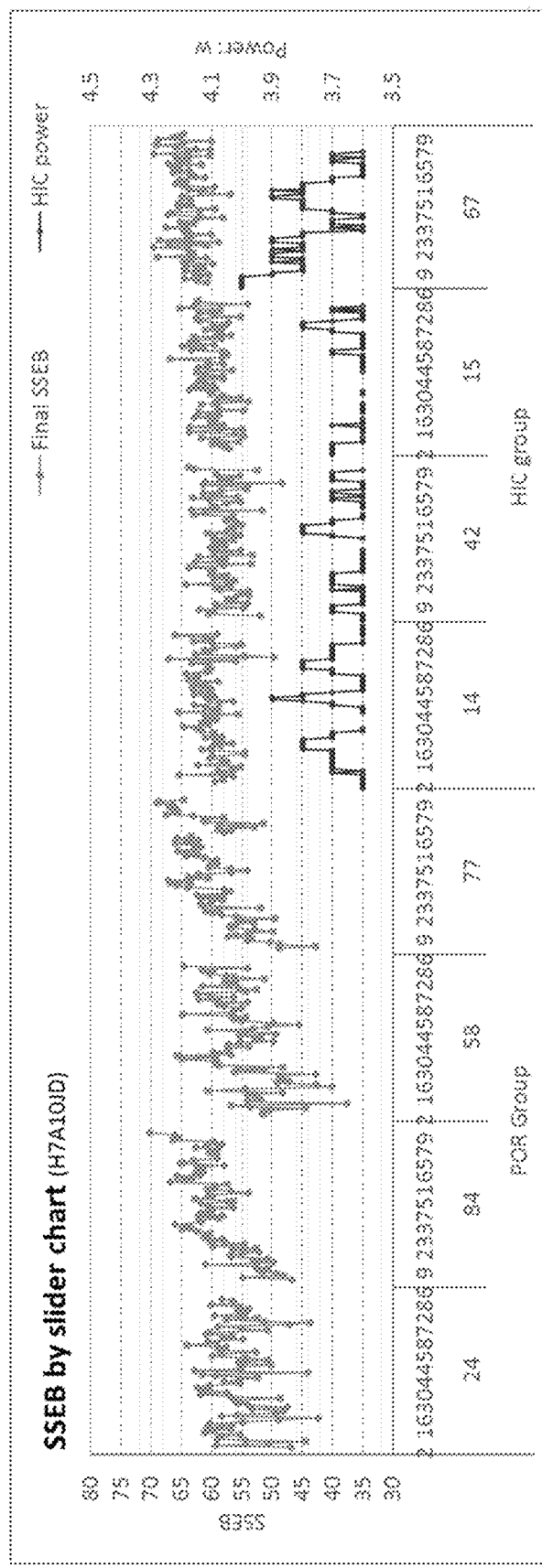
FIG. 8 presents data from an experiment group in an embodiment of the present disclosure.

To further highlight the beneficial effects of height control of the embodiments of the present disclosure, please refer to FIG. 8. FIG. 8 shows data from a test group according to the embodiments of the present disclosure, and FIG. 8 is a comparison of test results. Each "point" represents a value corresponding to a specific magnetic head. The vertical axis on the left-hand side represents the SSEB value from a functional test of the write head, the unit is nanometer; the vertical axis on the right-hand side represents the laser heating power, the unit is "W". The horizontal axis in the figure represents material information, "POR" denotes a current normal process state group (that is, the magnetic heads are prepared using a prior art method), "HIC" denotes a laser heating experiment group, and "24, 84, 58 . . . 67" represents the numerical value assigned to the magnetic stripes. A comparison of the data shows that the difference in SSEB values between the magnetic heads of the experiment group based on HIC (heating induced compensation) is significantly less (the magnetic heads in the same article have consistent SSEB results) than the difference between the magnetic heads of the current normal process state group, which is quite large (gradual trend in the same article).

Another embodiment of the present disclosure provides a magnetic head obtained by the method for processing a magnetic head described above.

Figure 9:
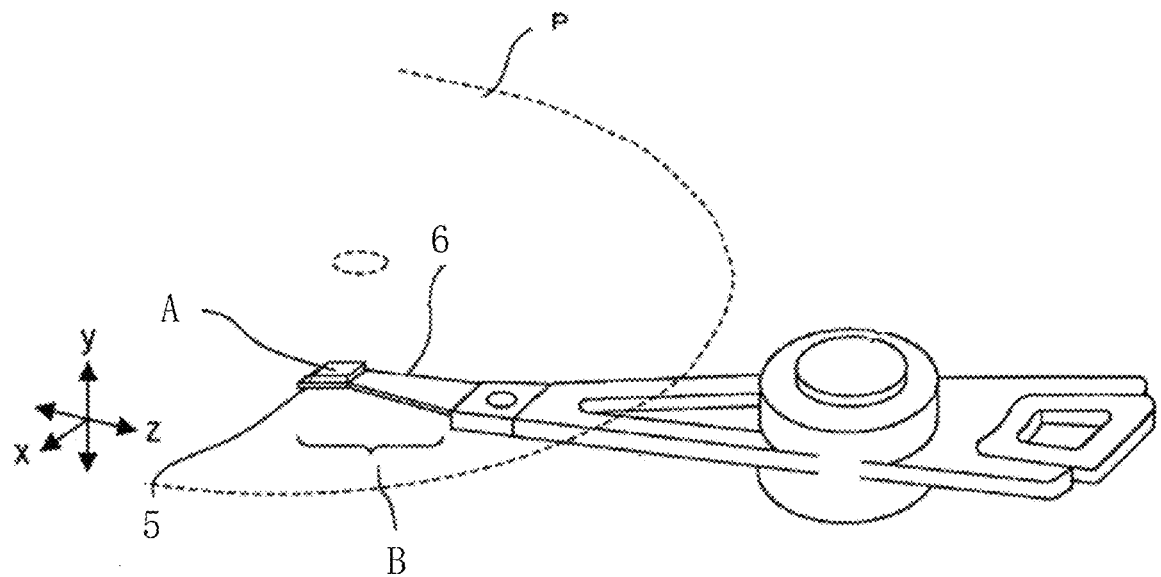
FIG. 9 is a structural diagram of a head gimbal assembly in an embodiment of the present disclosure.

Still another embodiment of the present disclosure provides a head gimbal assembly. Please refer to FIG. 9. FIG. 9 is a structural diagram of the head gimbal assembly in one of the embodiments of the present disclosure. In this figure, The head gimbal assembly B comprises magnetic head A configured opposite to the storage medium P as described above; and a cantilever member elastically supporting magnetic head A, wherein the cantilever member comprises a flexible member 5, which is provided at the bottom of the magnetic head A and used to support the magnetic head A; the cantilever member also comprises a load rod 6 for supporting head gimbal assembly B and connect the assembly with an external drive arm.

Yet another embodiment of the present disclosure provides a hard disk drive comprising the magnetic head configured opposite to the storage medium as described above; and,
  a positioning device determining the position of the magnetic head with respect to the storage medium while supporting the magnetic head.

The magnetic head, the head gimbal assembly, the hard disk drive, and the method for processing the magnetic head provided by the embodiments of the present disclosure have at least one of the beneficial effects below:
  (1) During processing, a laser irradiation device is used to irradiate a specific position of the read/write part of the magnetic head. Heating induces expansion of the read head and the write head following the principles of heat transfer and thermal expansion/contraction. The subsequent lapping process laps the magnetic heads to adjust the height of the magnetic heads such that at the end of the process, the heights of the read head and the write head of each magnetic head meet their respective target values. This enables the best performance for reading from and writing to the disk's storage medium.
  (2) Directly lapping the read head and the write head is not possible due to the very small distance of only around 5 µm between the two. Current lapping techniques are unable to achieve height control at a nanometer level in such a small range. In the present technical solution, the magnetic heads are lapped in batches, that is, a lapping device is used to process heat expanded magnetic heads, the final heights of the read head hr and the write head hw can be precisely controlled by integrated lapping.

The embodiments described above only illustrate several possible embodiments of the present disclosure. The descriptions of these embodiments are specific and detailed, and should not be construed as limiting the scope of the patent of the present disclosure. It should be pointed out that for those of ordinary skill in the art, modifications and improvements can be made without departing from the spirit of the present disclosure, and these modifications and improvements all belong to the protection scope of the present disclosure. The protection scope of the present disclosure is defined by the claims.

What is claimed is:

1. A method for processing a magnetic head, the magnetic head comprising a substrate and a thin-film magnetic head formed at an end of the substrate, the thin-film magnetic head comprising a read/write part and a bonding pad part proximate to the read/write part, the read/write part is in the form of a protruding part and is arranged on an air bearing surface opposite to a storage medium, and the read/write part has a write head for writing information in the storage medium and a read head for reading information from the storage medium; the bonding pad part comprises a welding contact point formed on an end surface of the thin-film magnetic head, wherein the method for processing the magnetic head comprises:

irradiating at a fixed point proximate to the read/write part with a laser irradiation device until the read head and the write head are thermally expanded to produce target expansion;

orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar, so that the heights of the read head and the write head of each of the plurality of magnetic heads meet their respective target values; and disassembling the magnetic strip to obtain a lapped magnetic head;

wherein the step of irradiating at the fixed point proximate to the read/write part with the laser irradiation device until the read head and the write head are thermally expanded comprises:

irradiating the bonding pad part at the fixed point with the laser irradiation device until the heated welding contact point transfers heat to the read head and the write head, resulting in thermal expansion of the read head and the write head; and wherein the irradiating of the bonding pad part at the fixed point with the laser irradiation device comprises: irradiating the welding contact point located at a preset distance from the write head with the laser irradiating device, wherein the preset distance is 10 µm to 20 µm.

2. A method for processing a magnetic head, the magnetic head comprising a substrate and a thin-film magnetic head formed at an end of the substrate, the thin-film magnetic head comprising a read/write part and a bonding pad part proximate to the read/write part, the read/write part is in the form of a protruding part and is arranged on an air bearing surface opposite to a storage medium, and the read/write part has a write head for writing information in the storage medium and a read head for reading information from the storage medium; the bonding pad part comprises a welding contact point formed on an end surface of the thin-film magnetic head, wherein the method for processing the magnetic head comprises:

irradiating at a fixed point proximate to the read/write part with a laser irradiation device until the read head and the write head are thermally expanded to produce target expansion;

orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar, so that the heights of the read head and the write head of each of the plurality of magnetic heads meet their respective target values; and disassembling the magnetic strip to obtain a lapped magnetic head;

wherein the step of irradiating at the fixed point proximate to the read/write part with the laser irradiation device until the read head and the write head are thermally expanded comprises:

irradiating the air bearing surface proximal to the read/write part with the laser irradiation device until an open end of the read head, which protrudes from the air bearing surface and is exposed, transfers heat to the read head and the write head, resulting in thermal expansion of the read head and the write head.

3. A method for processing a magnetic head, the magnetic head comprising a substrate and a thin-film magnetic head formed at an end of the substrate, the thin-film magnetic head comprising a read/write part and a bonding pad part proximate to the read/write part, the read/write part is in the form of a protruding part and is arranged on an air bearing surface opposite to a storage medium, and the read/write part has a write head for writing information in the storage medium and a read head for reading information from the storage medium; the bonding pad part comprises a welding contact point formed on an end surface of the thin-film magnetic head, wherein the method for processing the magnetic head comprises:

irradiating at a fixed point proximate to the read/write part with a laser irradiation device until the read head and the write head are thermally expanded to produce target expansion;

orientating air bearing surfaces of a plurality of magnetic heads forming a magnetic strip toward a lapping surface of a lapping device after laser irradiation, holding the air bearing surfaces in place, lapping with the lapping device until the air bearing surfaces are coplanar, so that the heights of the read head and the write head of each of the plurality of magnetic heads meet their respective target values; and disassembling the magnetic strip to obtain a lapped magnetic head;

wherein the step of irradiating at the fixed point proximate to the read/write part with the laser irradiation device until the read head and the write head are thermally expanded comprises:

irradiating the air bearing surface proximal to the read/write part with the laser irradiation device until an open end of the write head, which protrudes from the air bearing surface and is exposed, transfers heat to the read head and the write head, resulting in thermal expansion of the read head and the write head.

* * * * *